United States Patent
Rückert

[11] Patent Number: 5,895,189
[45] Date of Patent: Apr. 20, 1999

[54] DEVICE FOR HOLDING TWO STRUCTURAL PARTS IN A SPACED RELATIONSHIP WITH RESPECT TO EACH OTHER

[75] Inventor: Edvard Rückert, Velbert, Germany

[73] Assignee: Ewald Witte GmbH & Co. KG, Velbert, Germany

[21] Appl. No.: 08/939,930

[22] Filed: Sep. 29, 1997

[30] Foreign Application Priority Data

Oct. 15, 1996 [DE] Germany ............ 196 42 446

[51] Int. Cl.⁶ ............................................. F16B 43/00
[52] U.S. Cl. ............... 411/535; 411/546; 403/DIG. 1
[58] Field of Search ........................... 411/535, 536, 411/546, 531; 403/408.1, 409.1, DIG. 1, 350

[56] References Cited

U.S. PATENT DOCUMENTS 2,678,228  5/1954  Gerhardt ............ 403/DIG. 1
4,682,906  7/1987  Rückert ............ 411/535

Primary Examiner—Flemming Saether
Attorney, Agent, or Firm—Martin A. Farber

[57] ABSTRACT

A device for holding two structural parts (1, 2) in a spaced relationship with respect to each other, having a spacer for filling the distance between the two structural parts, the spacer having a support part (3) which can be brought into a position fixed for rotation with respect to the first structural part (1) and a rotary drive part (4) which can be displaced axially with respect to the support part (3) by rotation, the support part (3) and the rotary drive part (4) resting on a helical engagement surface (7, 8) which has a slope which is opposite the slope of a thread of a screw (5) which, upon being screwed into an axial opening (11) in the rotary drive part, carries the latter along in rotation. The support part (3) and rotary drive part (4) are magnetically attached to each other, the support part (3) and/or the rotary drive part (4) being of permanently magnetic material.

6 Claims, 3 Drawing Sheets

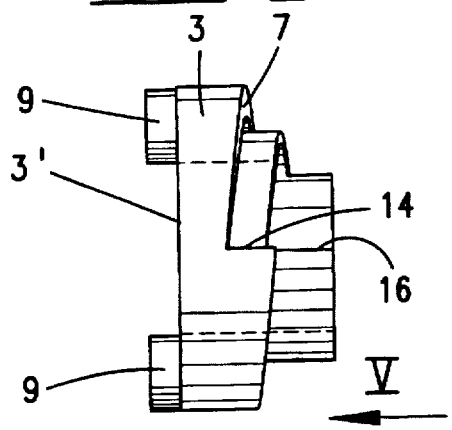
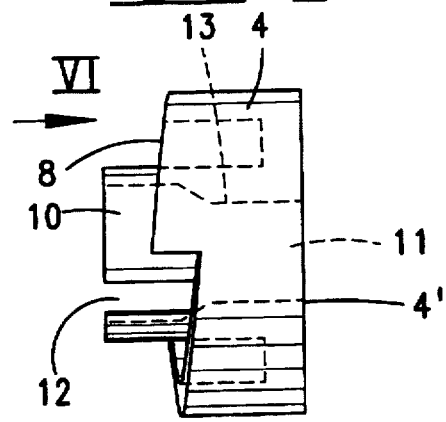
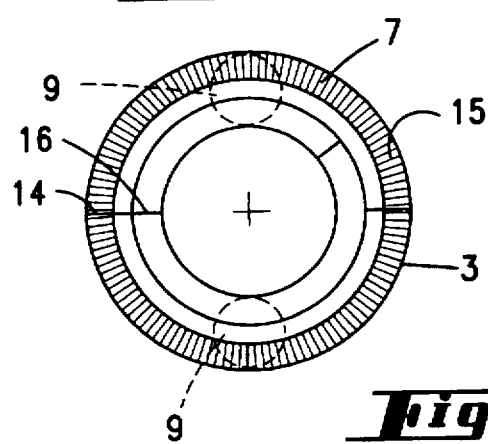
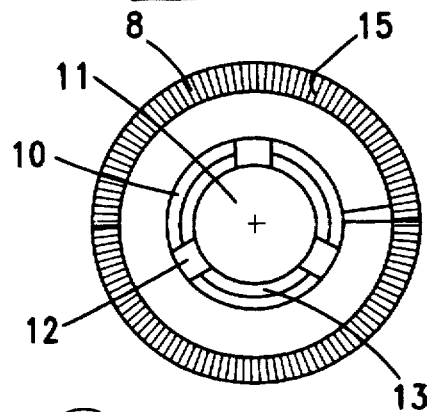
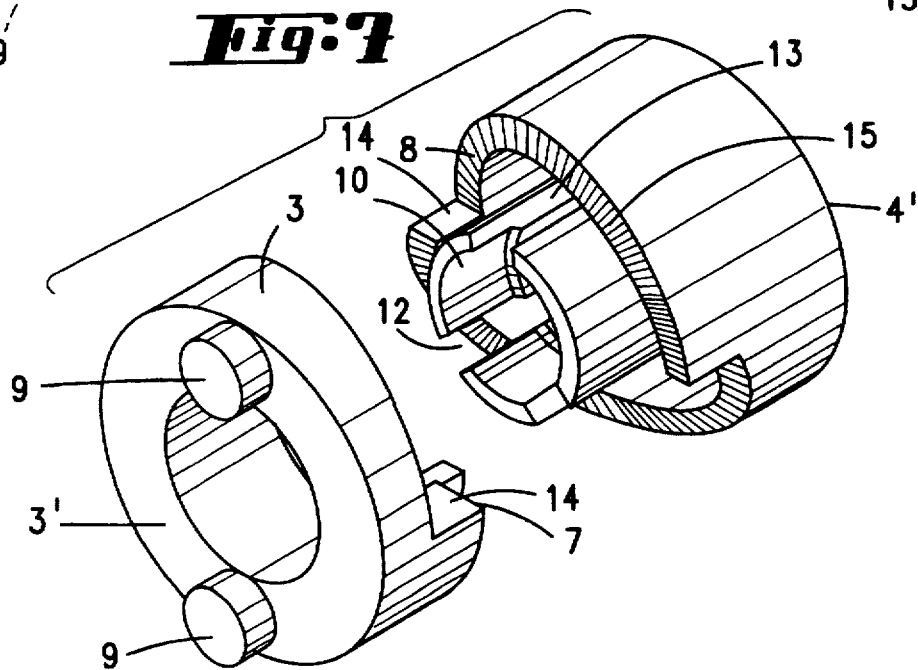

DEVICE FOR HOLDING TWO STRUCTURAL PARTS IN A SPACED RELATIONSHIP WITH RESPECT TO EACH OTHER

FIELD AND BACKGROUND OF THE INVENTION

The present invention relates to a device for holding two structural parts in a spaced relationship with respect to each other.

One such device operates on the basis of the principle described in European Patent Application 0 176 663. The device consists of a support part which can be brought into a position secured against rotation with the first part. The helical engagement surface of a rotary drive part rests on a helical engagement surface of the support part. The rotary drive part can be turned with respect to the support part. In such case, the two engagement surfaces slide on one another so that, as a result of their helical shape, the spaced-apart relationship of those two end surfaces of the support parts which face away from each other are moved apart from each other. Support part and rotary drive part lie one behind the other in axial direction, a screw which extends coaxial to the axis passing through an opening in the device. The screw has a thread of a direction opposite that of the engagement surface. In case of a right-hand screw, the engagement surface is developed as a left-hand winding. Upon being screwed into the rotary drive part, the screw, as a result of a frictional engagement of its external thread in the hole in the rotary drive part carries the rotary drive part along with it so that the engagement surfaces slide on each other and the end surface of the rotary drive part can move until it comes against the second structural part so that the distance between the two structural parts is filled up. Further turning of the screw then no longer leads to the carrying along of the rotary drive part so that the screw can be screwed in completely and then be screwed, on the opposite side, into a corresponding internal thread of the second structural part so that the two structural parts are fastened to each other. In the device of this type, support part and rotary drive part are connected to each other as a complete assembly unit. This is effected, for instance, in the manner that the parts are snapped onto one another by a spring or other means. For the preassembly, it is furthermore necessary that the support part be brought into a temporary fastening position with respect to the first structural part. For this, hook-shaped extensions are used by which the support part can be snapped onto the first structural part.

SUMMARY OF THE INVENTION

An object of the invention is to improve the assembling of a device of this type.

According to the invention, the rotary drive part and the support part are magnetically attracted to each other.

As a result of the development in accordance with the invention, a simplified preassembling is possible. Either the support part or the rotary drive part are permanently magnetized, the other part consisting of a ferromagnetic material so that the parts attract each other as a result of the magnetic force. In this way, it is possible to do without springs or other clip connections between the two parts. It is particularly advantageous in this connection that the parts adhere to each other without play in every condition of displacement. Another advantage is that, if the first structural part also consists of a ferromagnetic material, then the fastening feet of the support part need merely be developed as extensions which engage into corresponding recesses in the first structural part. The adherence to the first structural part need not then be produced by a snap attachment, but takes place via the magnetic action. In an advantageous further development, both the support part and the rotary drive part are permanently magnetized. In this way, a positive orientation is obtained upon the assembling of the two parts so that the preassembly of the individual parts is considerably simplified since the rotary drive part and support part can be assembled together only with the correct magnetic polarization. In an advantageous further development, only one or two pin-shaped, eccentrically arranged extensions are provided on the support surface of the support part. The support surfaces which slide mutually on each other can furthermore have a fluting so that the spaced position is also secured against vibration.

BRIEF DESCRIPTION OF THE DRAWINGS

With the above and other objects and other advantages in view, the present invention will become more clearly understood in connection with the detailed description of a preferred embodiment, when considered with the accompanying drawings of which:

FIG. 3 shows the support part;

FIG. 4 shows the rotary drive part;

FIG. 5 is a top view of FIG. 3;

FIG. 6 is a top view of FIG. 4;

FIG. 7 is a perspective view of support part and rotary drive part in the preassembly position.

DETAILED DESCRIPTION OF THE PREFERRED EMBODIMENT

Figure 1:
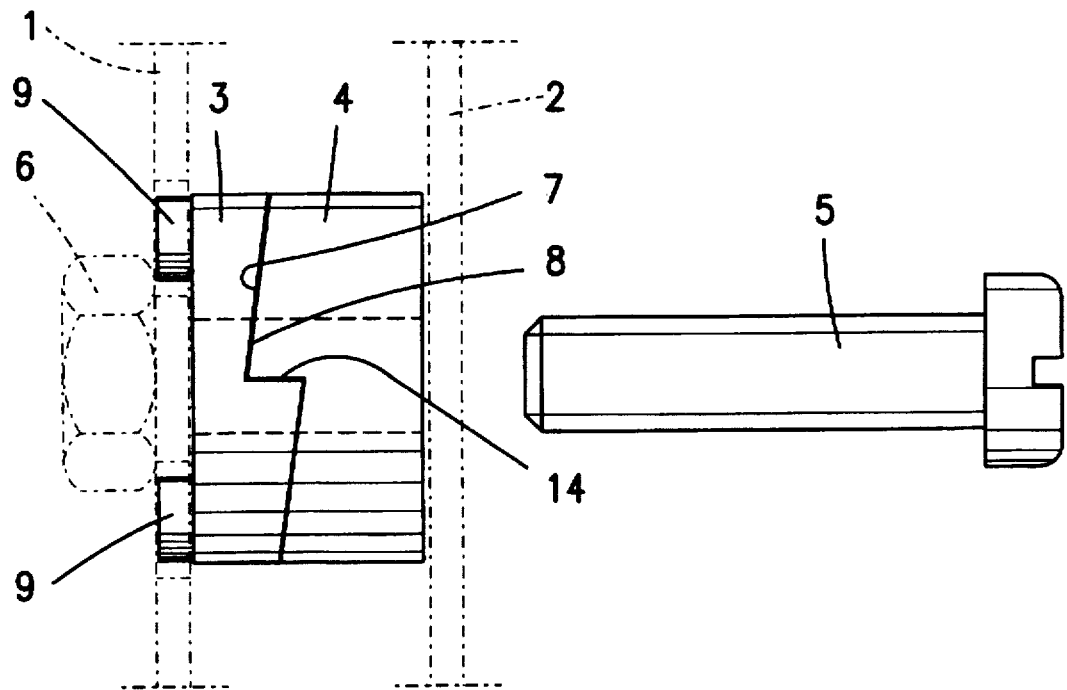
FIG. 1 is a side view of the device of the invention prior to assembly.
Figure 2:
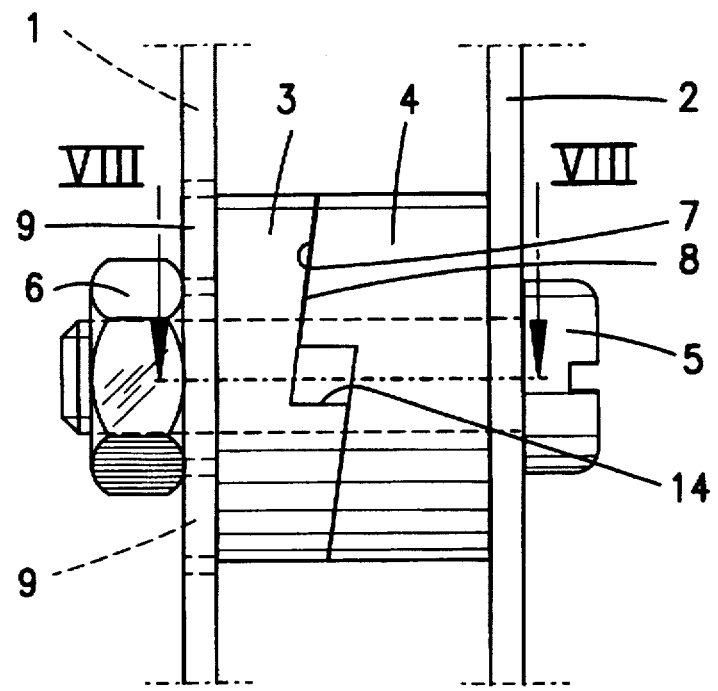
FIG. 2 is a side view after assembly.
Figure 8:
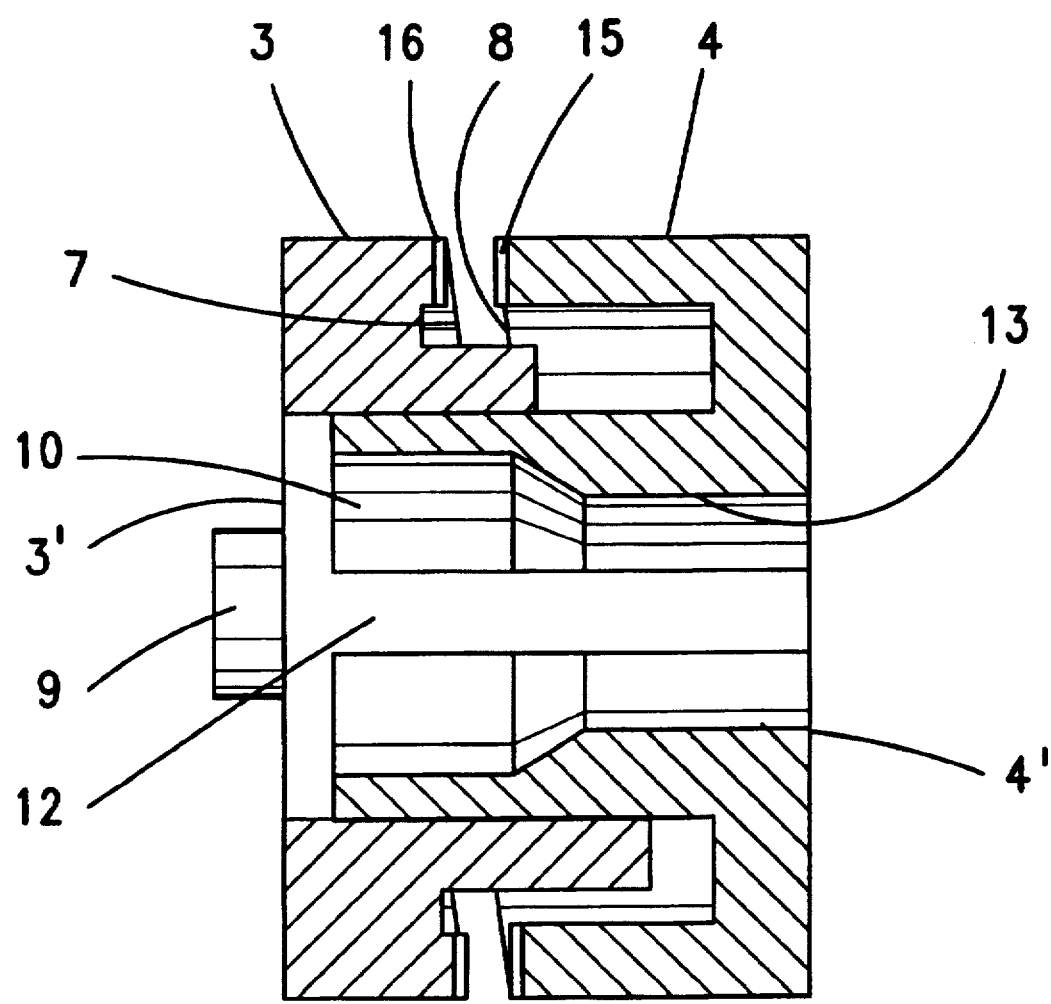
FIG. 8 is a section along the line XIII—XIII of FIG. 2.

The device for the holding or attaching of two structural parts in a spaced relationship has a support part 3 and a rotary drive part 4. Support part 3 and rotary drive part 4 have a central hole through which the threaded shank of screw 5 can be inserted. Both the support part 3 and the rotary drive part 4 have helical engagement surfaces 7, 8 which slide on each other upon the turning of the support part 3 with respect to the rotary drive part 4. The engagement surfaces 7 and 8 are provided with a fluting 15.

The helical engagement surfaces 7, 8 have stop edges 14 which strike against each other when support part 3 and rotary drive part 4 have their two end surfaces 3', 4' at the smallest distance apart. The helical engagement surfaces 7, 8 are associated with the radial outer region of rotary drive part 4 and support part 3. In a radially inner region, a second stop edge 16 is provided which acts when the two end surfaces 3', 4' are brought into their maximum distance apart by turning of the two parts into the maximum position. The rotary drive part 4 has a cylindrical centering extension 10 which extends into an opening of corresponding diameter in the support part 3. The inner wall of the centering extension 10 has a radially inwardly directed region 13 which forms a friction surface for the external thread of the screw 5 when the latter is screwed into the opening in the rotary drive part 4. The centering extension 10 may optionally have slot recesses 12.

The support part 3 and the rotary drive part 4 are formed of a permanently magnetic material. However, it is also sufficient if either the rotary drive part 4 or the support part 3 is made of this permanently magnetic material, in which case, to be sure, the other part must consist of a ferromagnetic material, for instance iron.

Preferably, however, both support part 3 and rotary drive part 4 are made of a permanently magnetic material and are so magnetically polarized that the two parts automatically turn in to the assembly direction when they are brought close to each other.

The engagement surface 3' of the support part 3 has pin-shaped extensions 9 which, when the support part 3 is placed on a first structural part, extend into recesses provided therein so as to connect the support part 3 fixed against rotation to the first structural part 1.

The assembling is effected in the following manner: First of all, the rotary drive part 4 and support part 3 are brought into a connection shown in FIG. 1, in which the support part 3 and the rotary drive part 4 are held against each other solely by magnetic forces. The support part 3 is then placed on the first structural part 1, which is preferably made of ferromagnetic material, the opening in the support part 3 being aligned with an opening or an internal thread in the first structural part 1. The internal thread can be formed, for instance, by a nut 6. The extensions 9 of the support part 3 engage in this connection into openings in the first structural part 1.

The second structural part 2 lies in parallel position to the support surface 4' of the rotary drive part 4. The screw 5 is then inserted, through the opening in the second structural part 2, into the screw-in opening 11 of the rotary drive part 4, so that the external thread of the screw 5 rubs on the friction surface 13. As a result of the friction, the rotary drive part 4 is carried along in rotation when the screw 5 is turned. The screw 5 has a right-hand thread. The engagement surfaces 7, 8 have the form of a left-hand winding. This has the result that when the screw 5 is screwed into the screw-in opening 11, the rotary drive part 4 turns until the engagement surface 4' comes against the second structural part 2. The screw 5 can then be screwed-in all the way until it engages into the internal thread of the nut 6.

I claim:

1. A device for holding two structural parts in a spaced relationship with respect to each other, comprising a spacer for filling the distance between the two structural parts, said spacer having a support part which is bringable into a position fixed against rotation with respect to a first of the structural parts and a rotary drive part which is displaceable axially with respect to the support part by rotation, the support part and the rotary drive part engaging on a helical engagement surface which has an inclination which is opposite to a pitch of a thread of a screw which, upon being screwed into an axial opening in the rotary drive part, carries the rotary drive part along in rotation, wherein said support part and said rotary drive part are magnetically attracted to each other.

2. A device according to claim 1, wherein the support part has an end surface provided with at least one pin-shaped eccentrically arranged extension.

3. A device according to claim 1, wherein the engagement surface has a fluting.

4. A device according to claim 1, wherein both said support part and said rotary drive part are so permanently magnetized in a direction of the axis of their central openings that they adhere to each other in a preassembly position by mutual attraction.

5. A device according to claim 1, wherein at least one of the support part and the rotary drive part is made of permanently magnetic material.

6. A device according to claim 1, wherein both the support part and the rotary drive part are made of permanently magnetic material.

* * * * *